US007522192B2

(12) United States Patent
Kikkawa

(10) Patent No.: US 7,522,192 B2
(45) Date of Patent: Apr. 21, 2009

(54) PORTABLE TERMINAL APPARATUS, CONTROL METHOD THEREFOR, AND RECORDING MEDIUM WHICH RECORDS CONTROL PROGRAM

(75) Inventor: Yasushi Kikkawa, Tokyo (JP)

(73) Assignee: NEC Corporation (JP)

( * ) Notice: Subject to any disclaimer, the term of this patent is extended or adjusted under 35 U.S.C. 154(b) by 636 days.

(21) Appl. No.: 10/880,846

(22) Filed: Jun. 30, 2004

(65) Prior Publication Data

US 2005/0009562 A1      Jan. 13, 2005

(30) Foreign Application Priority Data

Jun. 30, 2003     (JP) .............................. 2003-186121

(51) Int. Cl.
H04N 9/73     (2006.01)
H04M 1/00     (2006.01)
(52) U.S. Cl. .................................... 348/227.1; 455/567
(58) Field of Classification Search ............. 348/227.1, 348/460, 552; 455/567
See application file for complete search history.

(56) References Cited

U.S. PATENT DOCUMENTS 5,450,163 A * 9/1995 Iwasaki ...................... 396/234
6,122,366 A * 9/2000 Veschi ................... 379/373.02
6,933,973 B1 * 8/2005 Sako .......................... 348/308
2003/0073467 A1 * 4/2003 Tanaka et al. ............... 455/567

FOREIGN PATENT DOCUMENTS

JP     2000-184013     6/2000

OTHER PUBLICATIONS

Machine translation of JP 2000-184013 (Tanaka, Yoshiaki), Jun. 30, 2000.*
Translation of JP 2000-184013 (Tanaka, Yoshiaki), Jun. 30, 2000.*

* cited by examiner

Primary Examiner—David L Ometz
Assistant Examiner—Dillon Durnford-Geszvain
(74) Attorney, Agent, or Firm—Ostrolenk, Faber, Gerb & Soffen, LLP

(57) ABSTRACT

A portable terminal apparatus includes a camera, loudspeaker, determination unit, and control unit. The camera senses an image. The loudspeaker outputs a notification sound. The determination unit determines whether it is bright around the portable terminal apparatus, at a predetermined time interval on the basis of a video signal from the camera. The control unit controls to increase/decrease the output volume of the loudspeaker by a predetermined value in accordance with the determination result every time the determination unit performs determination. A portable terminal apparatus control method and a recording medium which records a program are also disclosed.

19 Claims, 8 Drawing Sheets

PORTABLE TERMINAL APPARATUS, CONTROL METHOD THEREFOR, AND RECORDING MEDIUM WHICH RECORDS CONTROL PROGRAM

BACKGROUND OF THE INVENTION

The present invention relates to a portable terminal apparatus, a control method therefor, and a recording medium which records a control program and, more particularly, to a portable terminal apparatus having a camera which senses an image, a control method therefor, and a recording medium which records a control program.

Recent portable terminal apparatuses such as a cell phone are equipped with a camera function. Especially a foldable portable terminal apparatus has two cameras: one camera is attached to a front surface having a keyboard and LCD, and the other one is attached to a rear surface on the sub-LCD side which serves as an outer surface even when the portable terminal apparatus is folded. These cameras can photograph still and moving pictures, similar to a digital camera.

Of the two mounted cameras, the camera on the rear surface faces outside in the folded state and does not operate in this state. If necessary, this camera function can be used, and the portable terminal apparatus can grasp its current situation to a certain degree.

The user of the portable terminal apparatus usually holds it in a pocket or bag, and the portable terminal apparatus often rings in the pocket or bag. When the portable terminal apparatus rings, the user takes it out and pushes the talk button. In this series of operations, the ringing tone is silent in the bag to people around the user, but suddenly becomes loud when the portable terminal apparatus is taken out from the bag. The ringing tone becomes harsh to the ear.

As a technique of suppressing uncomfortableness of the ringing tone to people around the portable terminal apparatus, there is proposed a technique disclosed in, e.g., reference 1 (Japanese Patent Laid-Open No. 2000-184013 (pp. 2-4, FIG. 1)). In reference 1, the ambient brightness is determined on the basis of an image sensing signal from the camera of a cell phone. The ringing tone level is set to an initial one when it is dark around the portable terminal apparatus, and to a level lower than the initial level when it is bright.

However, control more suited to the surroundings than the above-described one is required by more finely controlling the ringing tone level over time and more accurately determining the ambient brightness.

SUMMARY OF THE INVENTION

The present invention has been made to overcome the conventional drawbacks, and has as its object to further reduce uncomfortableness of the ringing tone to people around the portable terminal apparatus by performing control more suited to the surroundings than conventional control of the ringing tone level.

To achieve the above object, according to the present invention, there is provided a portable terminal apparatus comprising a camera which senses an image, audio output means for outputting a notification sound, determination means for determining whether it is bright around the portable terminal apparatus, at a predetermined time interval on the basis of a video signal from the camera, and control means for controlling to increase/decrease an output volume of the audio output means by a predetermined value in accordance with a determination result every time the determination means performs determination.

According to the present invention, there is provided a method of controlling a portable terminal apparatus having a camera which senses an image, and audio output means for outputting a notification sound, comprising the steps of determining whether it is bright around the portable terminal apparatus, at a predetermined time interval on the basis of a video signal from the camera, and controlling to increase/decrease an output volume of the audio output means by a predetermined value in accordance with a determination result every time determination is performed.

BRIEF DESCRIPTION OF THE DRAWINGS

FIGS. 1A and 1B are views showing the outer appearance of a portable terminal apparatus according to an embodiment of the present invention, in which FIG. 1A shows a state in which the portable terminal apparatus is not folded, and FIG. 1B shows a state in which the apparatus is folded;

DESCRIPTION OF THE PREFERRED EMBODIMENT

A preferred embodiment of the present invention will be described below with reference to the accompanying drawings.

Figure 1A:
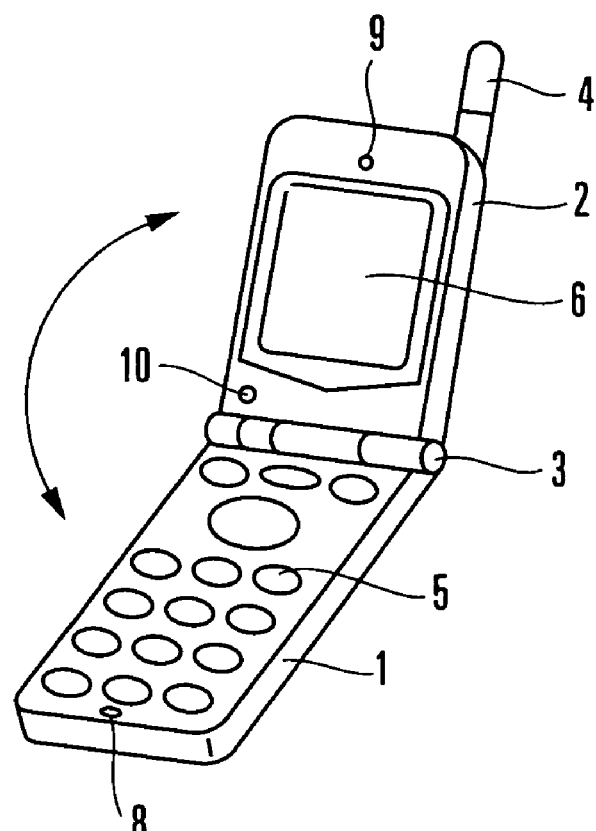
Figure 1B:
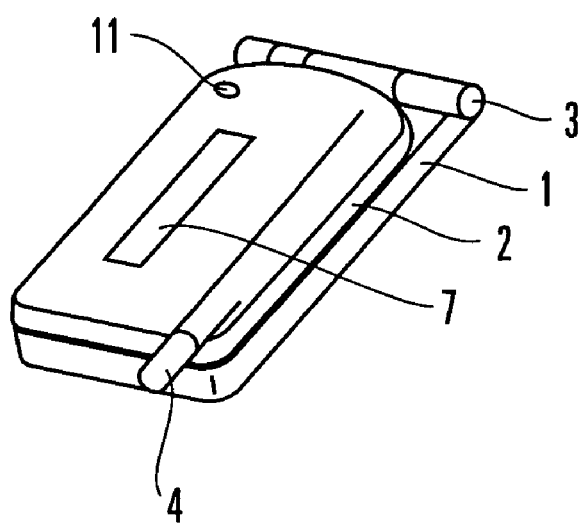

FIGS. 1A and 1B show the outer appearance of a portable terminal apparatus according to the embodiment of the present invention. More specifically, FIG. 1A shows a state in which the portable terminal apparatus is not folded, and FIG. 1B shows a state in which the apparatus is folded.

In FIG. 1A, the portable terminal apparatus according to the embodiment of the present invention has a foldable structure in which a main body 1 and lid 2 can be folded via a hinge 3. That is, the terminal apparatus can be folded and opened in a direction indicated by the arrow shown in FIG. 1A by using the hinge 3 as a shaft. As shown in FIG. 1A, the main body 1 comprises an operation portion 5 and microphone 8 for user operation. The lid 2 comprises a first display 6, loudspeaker 9, and first camera 10. As shown in FIG. 1B, a second display 7 and second camera 11 are attached to a surface of the lid 2 on a side opposite to the surface having the first display 6. The lid 2 further comprises an antenna 4 which transmits and receives radio waves.

Figure 2:
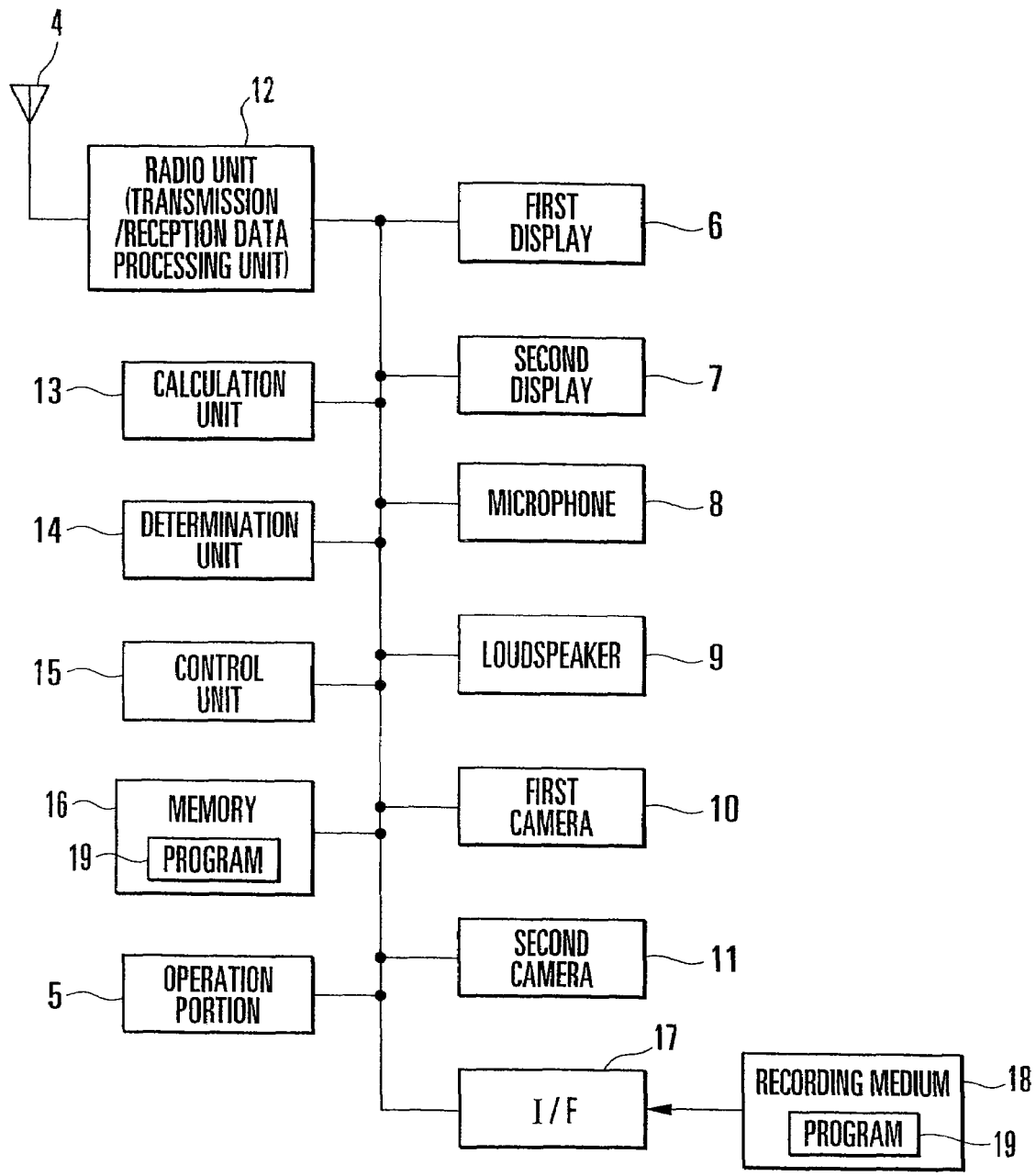
FIG. 2 is a block diagram showing the arrangement of the portable terminal apparatus according to the embodiment of the present invention.

FIG. 2 shows the arrangement of the portable terminal apparatus according to the embodiment of the present invention. In FIG. 2, the same reference numerals as in FIGS. 1A and 1B denote the same parts. As shown in FIG. 2, the portable terminal apparatus according to the embodiment of the present invention comprises the antenna 4, a radio unit (transmission/reception data processing unit) 12, the displays 6 and 7 formed of, e.g., LCDs, the microphone 8, the loudspeaker (audio output unit) 9, the cameras 10 and 11, the operation portion 5, a calculation unit 13, a determination unit 14, a control unit 15, a memory 16, and an interface (I/F) 17.

The cameras 10 and 11 are portable terminal cameras mounted in the portable terminal apparatus, and have a function of converting a sensed image into YCBCR data and outputting the data. Video signals output from the cameras 10 and 11 are processed by the control unit 15. The displays 6 and 7 display images on the basis of the video signals processed by the control unit 15. The operation portion 5 serves as the key input device of the portable terminal apparatus, and comprises a ten-key pad, cursor key, function key, and the like. The loudspeaker 9 generates a ringing tone and notifies the user of termination when the portable terminal apparatus receives an incoming signal. The term "termination", as used herein, refers to a completed cell reception (i.e., termination of an incoming call process) prior to answering or retrieval of a message of the call.

The calculation unit 13 calculates the luminance level around the terminal apparatus on the basis of a video signal from the second camera 11. The determination unit 14 compares the calculation result of the calculation unit 13 with a specified value, and determines the brightness around the terminal apparatus. The control unit 15 operates in accordance with a control program 19 stored in the memory 16, and controls the respective parts of the portable terminal apparatus. The control unit 15 is formed from a CPU (computer). The control program 19 is provided in a state in which it is recorded on a recording medium 18 such as an optical disk, magnetic disk, or semiconductor memory. When the recording medium 18 is connected to the I/F 17, the control unit 15 reads out the control program 19 recorded on the recording medium 18, and stores the control program 19 in the memory 16.

Figure 3:
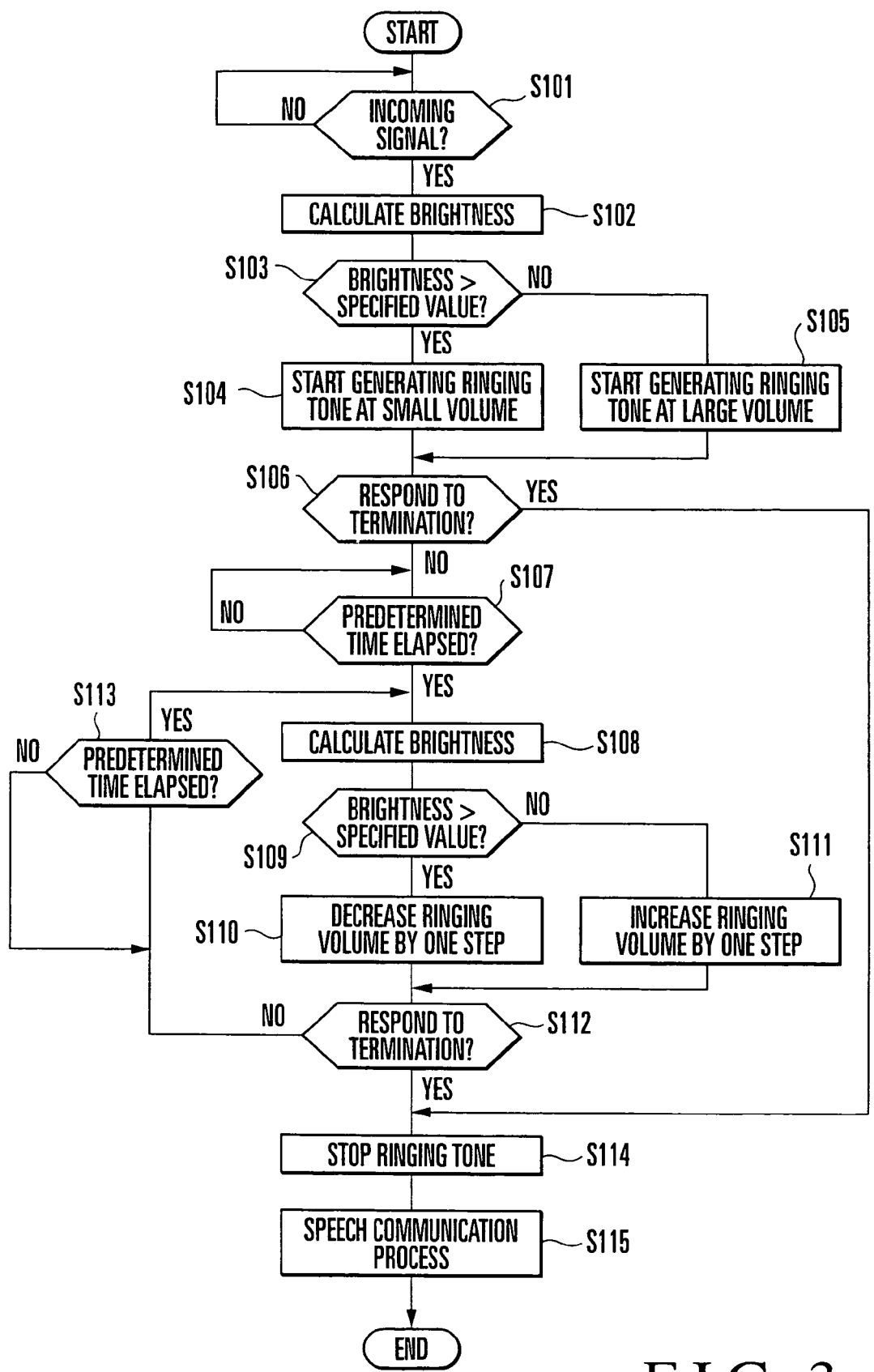
FIG. 3 is a flowchart showing an operation of the portable terminal apparatus according to the embodiment of the present invention.

The operation of the portable terminal apparatus according to the embodiment of the present invention will be explained with reference to the accompanying drawings. FIG. 3 shows an operation of the portable terminal apparatus according to the embodiment of the present invention.

As shown in FIG. 3, if the portable terminal apparatus receives an incoming signal (YES in step S101), the calculation unit 13 calculates the luminance level around the terminal apparatus on the basis of a video signal from the second camera 11 (step S102). The determination unit 14 compares the calculation result of the calculation unit 13 with a specified value, and determines the brightness around the terminal apparatus (step S103).

Figure 4A:
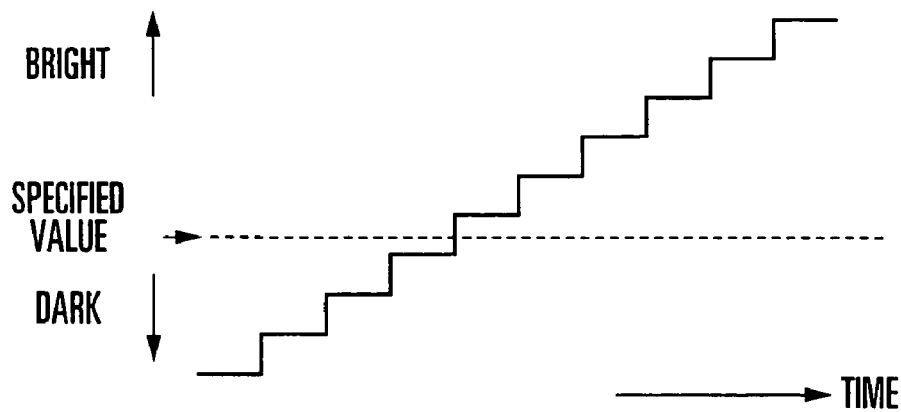
FIGS. 4A to 4C are charts for explaining determination of the brightness according to the embodiment of the present invention.
Figure 4B:
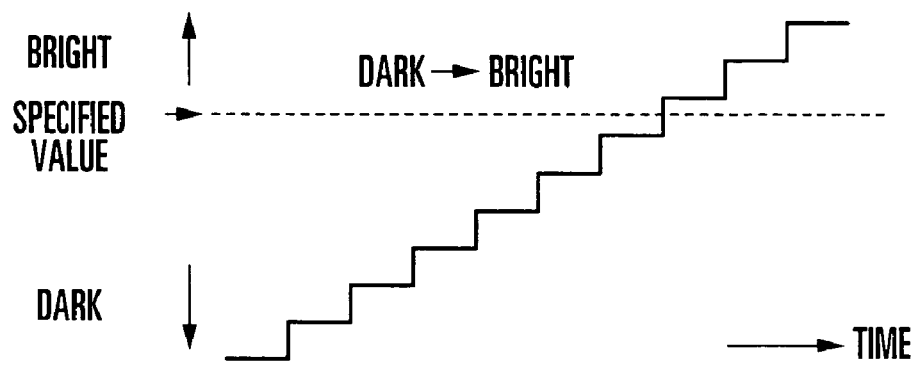
Figure 4C:
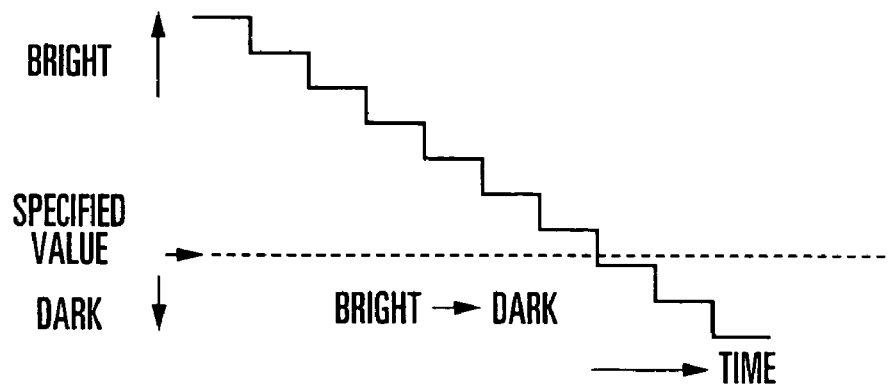

FIGS. 4A to 4C explain determination of the brightness by comparing a luminance level calculated by the calculation unit 13 with a specified value. As shown in FIG. 4A, it is determined to be bright around the terminal apparatus when the calculated luminance level is higher than the specified value, and dark when the calculated luminance level is equal to or lower than the specified value. The specified value can be changed, as needed. As shown in FIGS. 4B and 4C, it is also possible to individually set a specified value used when the state changes from a dark state to a bright state, and a specified value used when the state changes from a bright state to a dark state. In the example shown in FIGS. 4B and 4C, the specified value used upon a change from a dark state to a bright state is set to a "bright" side, and the specified value used upon a change from a bright state to a dark state is set to a "dark" side.

Referring back to FIG. 3, if the ambient luminance level is higher than the specified value, i.e., it is bright around the terminal apparatus (YES in step S103), the control unit 15 causes the loudspeaker 9 to start generating a ringing tone at a predetermined small volume (step S104). If the ambient luminance level is equal to or lower than the specified value, i.e., it is dark around the terminal apparatus (NO in step S103), the control unit 15 causes the loudspeaker 9 to start generating a ringing tone at a predetermined large volume (step S105).

If the user responds to termination by pressing a predetermined key (YES in step S106), generation of the ringing tone stops, and a speech communication process is done under the control of the control unit 15 (steps S114 and S115).

If the user does not respond to termination and a predetermined time has elapsed after the brightness determination process in steps S102 and S103 (steps S106 and S107), the brightness determination process is executed again. That is, the calculation unit 13 calculates the ambient luminance level again, similar to step S102 (step S108), and the determination unit 14 determines whether it is bright around the terminal apparatus, similar to step S103 (step S109).

If it is bright around the terminal apparatus (YES in step S109), the control unit 15 controls to decrease by one step the ringing volume output from the loudspeaker 9 (step S110). In response to this, the ringing volume decreases by a predetermined value. If it is dark around the terminal apparatus (NO in step S109), the control unit 15 controls to increase the ringing volume by one step (step S111). In response to this, the ringing volume increases by a predetermined value.

If the user responds to termination (YES in step S112), generation of the ringing tone stops, and a speech communication process is done under the control of the control unit 15 (steps S114 and S115).

If the user does not respond to termination and a predetermined time has elapsed after the brightness determination process in steps S108 and S109 (steps S112 and S113), the brightness determination process is executed again. The ringing volume is increased or decreased by one step in accordance with the determination result of the determination unit 14.

In the operation example shown in FIG. 3, the ringing volume is controlled by determining the brightness at a predetermined time interval. The ringing volume can be properly controlled in accordance with the environment which changes over time.

In the conventional control described above, when a plurality of reference levels used to determine the brightness are set and the ringing volume is switched in a plurality of steps, the ringing volume may greatly change upon a great change in ambient brightness. To the contrary, in the operation example shown in FIG. 3, the ringing volume is increased or decreased by only one step regardless of how much the ambient brightness changes. This can prevent a great change in ringing volume, and further reduce uncomfortableness of the ringing tone to people around the portable terminal apparatus.

In the operation example shown in FIG. 3, processes in step S102 and subsequent steps are performed when an incoming signal arrives (step S101). Alternatively, processes in step S102 and subsequent steps may be performed upon mail reception. In this case, the control target in steps S104, S105, S110, and S111 is the output volume of a mail reception notification message for notifying the user of mail reception, and no speech communication process in step S115 is done.

In the operation example shown in FIG. 3, the brightness is determined on the basis of a video signal from the second camera 11 attached to the rear surface of the portable terminal apparatus. Instead, the first camera 10 may be used. For example, when the portable terminal apparatus is not folded, the brightness may be determined on the basis of a video signal from the first camera 10.

The brightness of the second display 7 may also be controlled in addition to control of the ringing volume in accordance with the determination result of the determination unit 14. For example, when it is dark around the terminal apparatus, the brightness of the second display 7 is slightly reduced. This is because the user can see the screen display in a dark place even if the brightness of the second display 7 is slightly low. To the contrary, if it is bright around the terminal apparatus, the brightness of the second display 7 is increased. This is because the user cannot see the screen display in a bright place unless the brightness of the second display 7 is increased.

Figure 5:
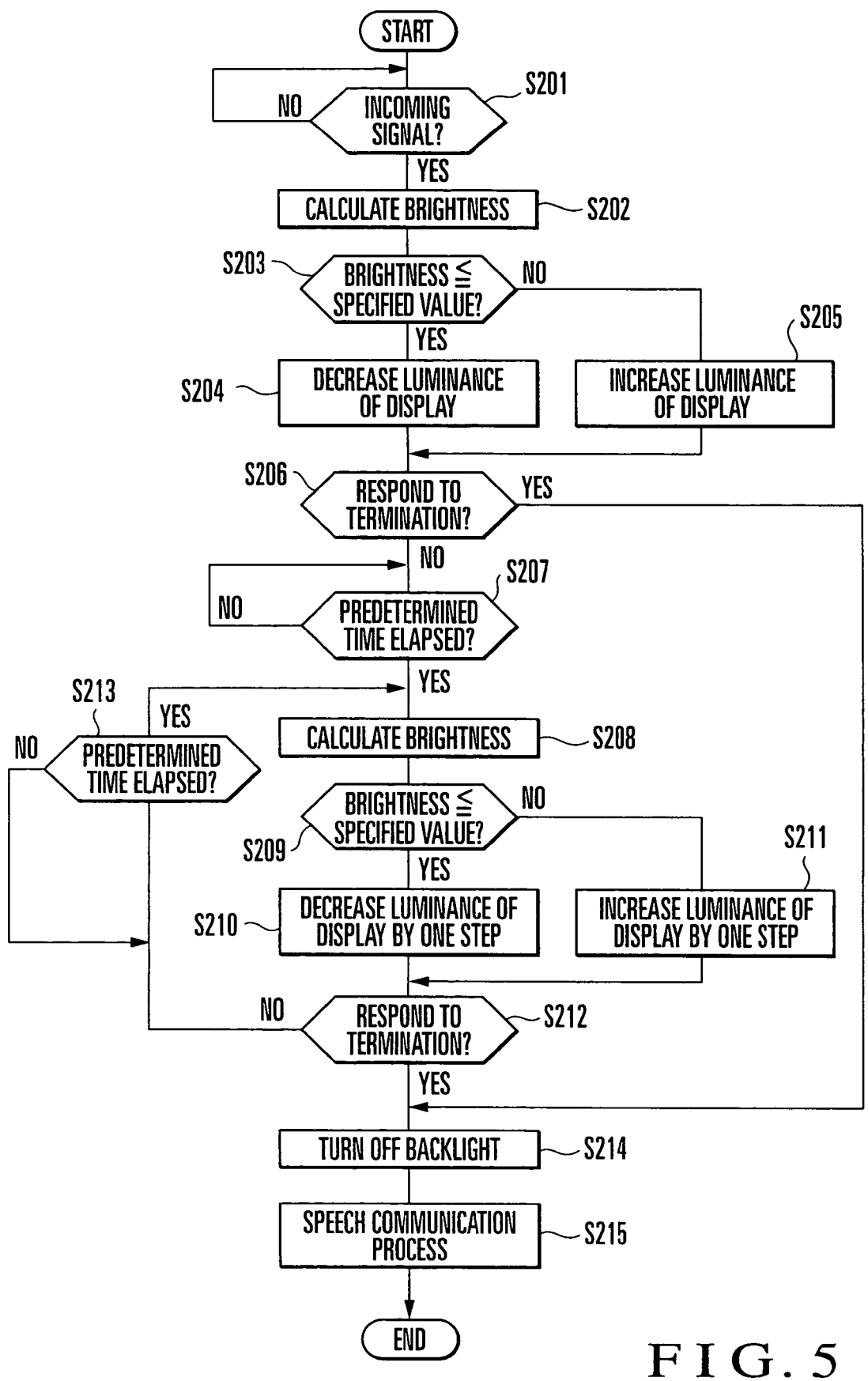
FIG. 5 is a flowchart showing another operation of the portable terminal apparatus according to the embodiment of the present invention.

An operation of controlling the brightness of the second display 7 in accordance with the determination result of the determination unit 14 will be explained with reference to the accompanying drawings. FIG. 5 shows another operation of the portable terminal apparatus according to the embodiment of the present invention.

As shown in FIG. 5, if the portable terminal apparatus receives an incoming signal (YES in step S201), the calculation unit 13 calculates the luminance level around the terminal apparatus on the basis of a video signal from the second camera 11 (step S202). The determination unit 14 compares the calculation result of the calculation unit 13 with a specified value, and determines the brightness around the terminal apparatus (step S203).

If it is dark around the terminal apparatus (YES in step S203), the control unit 15 controls the luminance of the backlight (not shown) of the second display 7 to decrease the brightness of the second display 7 (step S204). If it is bright around the terminal apparatus (NO in step S203), the control unit 15 controls the luminance of the backlight to increase the brightness of the second display 7 (step S205).

If the user responds to termination (YES in step S206), the backlight is turned off, and a speech communication process is done under the control of the control unit 15 (steps S214 and S215).

If the user does not respond to termination and a predetermined time has elapsed after the brightness determination process in steps S202 and S203 (steps S206 and S207), the brightness determination process is executed again. That is, the calculation unit 13 calculates the ambient luminance level again, similar to step S202 (step S208), and the determination unit 14 determines whether it is bright around the terminal apparatus, similar to step S203 (step S209).

If it is dark around the terminal apparatus (YES in step S209), the control unit 15 controls the luminance of the backlight to decrease the brightness of the second display 7 by one step (step S210). If it is bright around the terminal apparatus (NO in step S209), the control unit 15 controls the luminance of the backlight to increase the brightness of the second display 7 by one step (step S211).

If the user responds to termination (YES in step S212), the backlight is turned off, and a speech communication process is done under the control of the control unit 15 (steps S214 and S215).

If the user does not respond to termination and a predetermined time has elapsed after the brightness determination process in steps S208 and S209 (steps S212 and S213), the brightness determination process is executed again. The luminance of the display 7 is increased or decreased by one step in accordance with the determination result of the determination unit 14.

In the operation example shown in FIG. 5, processes in step S202 and subsequent steps are performed when an incoming signal arrives (step S201). Alternatively, processes in step S202 and subsequent steps may be performed upon mail reception. In this case, no speech communication process in step S215 is done.

In the operation example shown in FIG. 5, the brightness is determined on the basis of a video signal from the second camera 11 attached to the rear surface of the portable terminal apparatus. Instead, the first camera 10 may be used. For example, when the portable terminal apparatus is not folded, the brightness may be determined on the basis of a video signal from the first camera 10.

In the operation example shown in FIG. 5, the brightness of the second display 7 is controlled in accordance with the determination result of the determination unit 14, but the brightness of the first display 6 may be controlled. For example, when the portable terminal apparatus is not folded, the brightness of the first display 6 may be controlled in accordance with the determination result of the determination unit 14, or both the brightnesses of the displays 6 and 7 may be controlled.

Figure 6A:
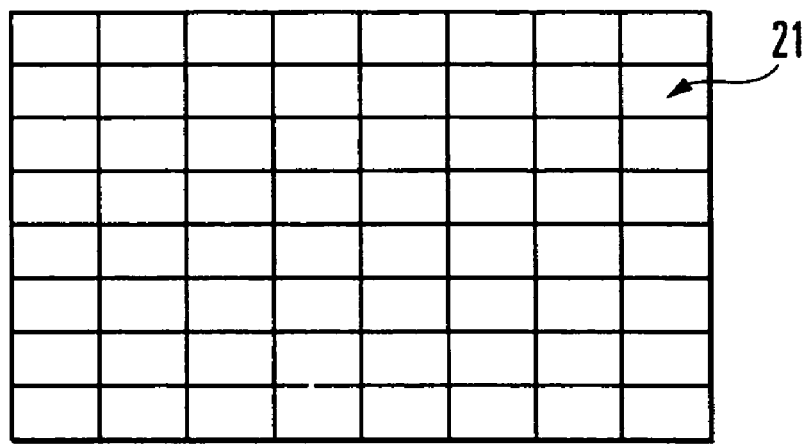
FIG. 6A is a view showing processing blocks which form one frame.
Figure 6B:
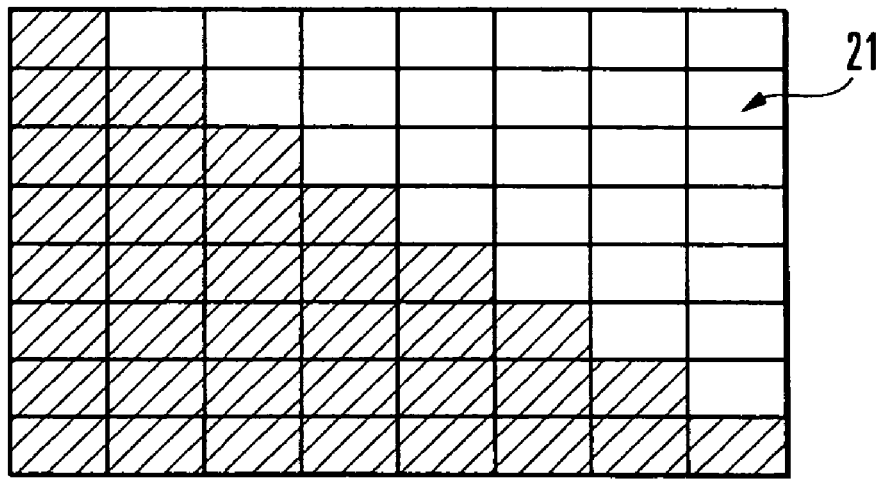
FIG. 6B is a view showing a case in which about half of one frame is bright and the remaining half is dark.

In order to more accurately determine the ambient brightness, the brightness determination process in the operation examples shown in FIGS. 3 and 5 may be executed in a manner to be described with reference to FIGS. 6A and 6B. FIG. 6A shows processing blocks which form one frame, and FIG. 6B shows a case in which about half of one frame is bright and the remaining half is dark.

The calculation unit 13 processes a video signal from the second camera 11 for predetermined processing blocks 21 shown in FIG. 6A, and thereby calculates the luminances of the processing blocks 21 which form one frame. The determination unit 14 compares the luminances of the processing blocks 21 with a specified value. When the number of processing blocks (bright blocks) having luminances higher than the specified value is, e.g., ½ or more of the number of processing blocks 21 which form one frame, as shown in FIG. 6B, the determination unit 14 determines that it is bright around the terminal apparatus.

Figure 7:
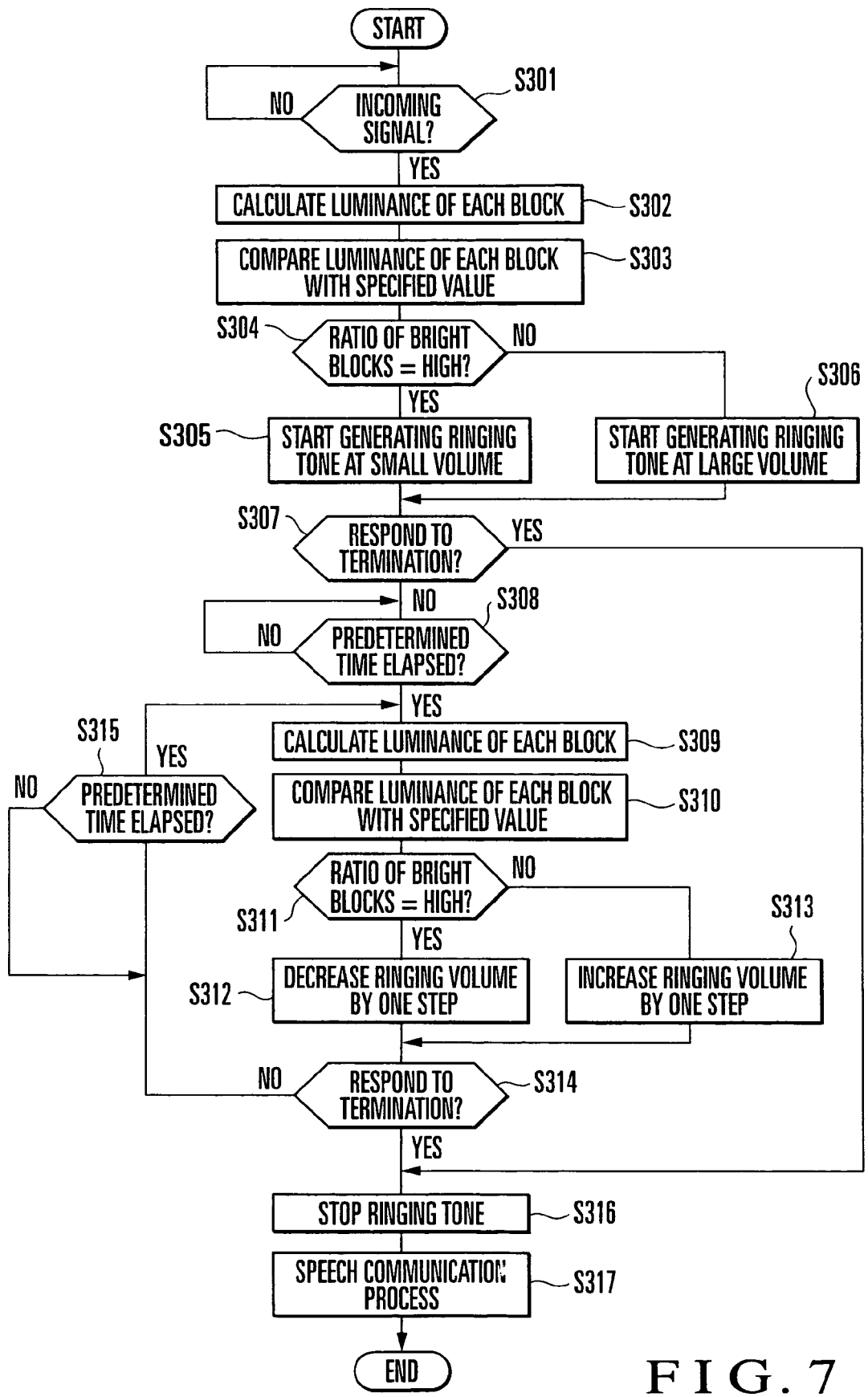
FIG. 7 is a flowchart showing a modification to the operation of FIG. 3.

FIG. 7 shows a modification to the operation of FIG. 3. As shown in FIG. 7, if the portable terminal apparatus receives an incoming signal (YES in step S301), the calculation unit 13 calculates the luminances of all the processing blocks 21 which form one frame, on the basis of a video signal from the second camera 11 (step S302). The determination unit 14 compares with a specified value the luminances of all the processing blocks 21 which form one frame (step S303).

If the number of bright blocks is, e.g., ½ or more of the total number of processing blocks 21 which form one frame (YES in step S304), the determination unit 14 determines that it is bright around the terminal apparatus, and the control unit 15 causes the loudspeaker 9 to start generating a ringing tone at a predetermined small volume (step S305). If the number of bright blocks is smaller than ½ of the total number of processing blocks 21 which form one frame (NO in step S304), the determination unit 14 determines that it is dark around the terminal apparatus, and the control unit 15 causes the loudspeaker 9 to start generating a ringing tone at a predetermined large volume (step S306). Also in steps S309 to S311, the same processes as those in steps S302 to S304 are done.

In steps S307, S308, and S312 to S317, the same processes as those in steps S106, S107, and S110 to S115 in FIG. 3 are performed. The brightness determination process is executed at a predetermined time interval unless the user responds to termination. The brightness determination process may be performed for each frame or several frames.

In this fashion, the luminances of the processing blocks 21 of one frame are calculated, and whether each processing block 21 is bright is determined. Finer brightness determination can be implemented while the ratio of bright and dark screens in one frame is determined. Uncomfortableness of the ringing tone to people around the portable terminal apparatus can be further reduced.

Figure 8:
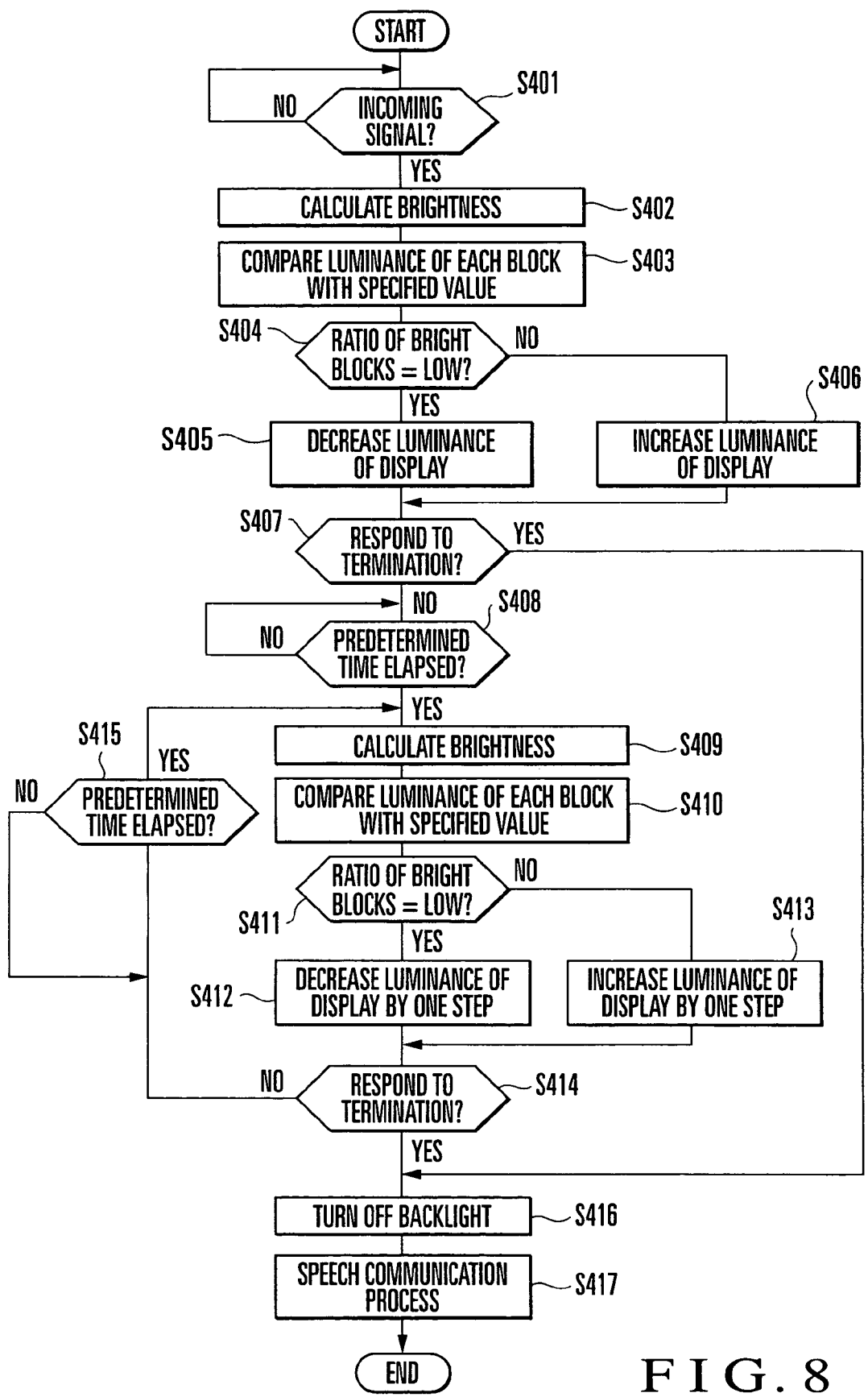
FIG. 8 is a flowchart showing a modification to the operation of FIG. 5.

FIG. 8 shows a modification to the operation of FIG. 5. As shown in FIG. 8, if the portable terminal apparatus receives an incoming signal (YES in step S401), the calculation unit 13 calculates the luminances of all the processing blocks 21 which form one frame, on the basis of a video signal from the second camera 11 (step S402). The determination unit 14 compares with a specified value the luminances of the processing blocks 21 which form one frame (step S403).

If the number of bright blocks is smaller than, e.g., ½ of the total number of processing blocks 21 which form one frame (YES in step S404), the determination unit 14 determines that it is dark around the terminal apparatus, and the control unit 15 decreases the brightness of the second display 7 (step S405). If the number of bright blocks is ½ or more of the total number of processing blocks 21 which form one frame (NO in step S404), the determination unit 14 determines that it is bright around the terminal apparatus, and the control unit 15 increases the brightness of the second display 7 (step S406). Also in steps S409 to S411, the same processes as those in steps S402 to S404 are done.

In steps S407, S408, and S412 to S417, the same processes as those in steps S206, S207, and S210 to S215 in FIG. 5 are performed. The brightness determination process is executed at a predetermined time interval unless the user responds to termination.

In the operation examples shown in FIGS. 7 and 8, the luminances of all the processing blocks 21 which form one frame are calculated in the brightness determination process. Alternatively, the luminances of only some of the processing blocks 21 in one frame may be calculated. For example, only the luminances of processing blocks 21 at four corners of one frame are calculated, and it is determined to be bright around the terminal apparatus if two or more blocks are bright, and dark if only one block is bright.

As has been described above, the embodiment controls the output volume of the audio output unit by determining the brightness at a predetermined time interval. The ringing volume can be more appropriately controlled in accordance with the surroundings which change over time. Uncomfortableness of the ringing tone to people around the portable terminal apparatus can be further reduced.

Of luminance and color difference signals output from the camera of the portable terminal apparatus, only the luminance signal is processed for a predetermined number of processing blocks 21 to calculate the luminances of the processing blocks 21 which form one frame. In this case, the ambient brightness can be more finely determined, and control more suited to the surroundings can be achieved. Hence, uncomfortableness of the ringing tone to people around the portable terminal apparatus can be further reduced.

What is claimed is:

1. A portable terminal apparatus comprising:
   a camera which senses an image;
   audio output means for outputting a notification sound;
   determination means for determining whether it is bright or dark around said portable terminal apparatus, at a predetermined time interval on the basis of a video signal from said camera, a determination of brightness around said portable terminal apparatus being made if a calculated luminance level is greater than a first specified value, and a determination of darkness around said portable terminal apparatus being made if a calculated luminance level is less than or equal to said first specified value, said first specified value being used at least when said determination means makes a determination of brightness after an immediately prior determination of brightness or makes a determination of darkness after an immediately prior determination of darkness; and
   control means for initially setting an output volume of said audio output means to a predetermined small volume if said determination of brightness is made or a predetermined large volume if said determination of darkness is made and then incrementally controlling to produce a step increase in said output volume of said audio output means by a predetermined value if said determination of darkness is made or a step decrease in said output volume of said audio output means by a predetermined value if said determination of brightness is made.

2. An apparatus according to claim 1, further comprising calculation means for calculating luminances of processing blocks which form one frame, on the basis of the video signal from said camera,
   wherein said determination means determines an ambient brightness on the basis of the luminances of the processing blocks that are calculated by said calculation means.

3. An apparatus according to claim 2, wherein said calculation means calculates luminances of only some of the processing blocks in one frame.

4. An apparatus according to claim 2, wherein said determination means compares the luminances of the processing blocks with said first specified value, and determines the ambient brightness on the basis of the number of processing blocks having luminances higher than said first specified value.

5. An apparatus according to claim 4, wherein said determination means individually sets a second specified value used when a state changes from a dark state to a bright state, and a third specified value used when the state changes from a bright state to a dark state.

6. An apparatus according to claim 1, wherein said determination means determines a brightness upon telephone termination or mail reception, and subsequently determines the brightness at a predetermined time interval.

7. An apparatus according to claim 1, wherein said audio output means outputs a notification sound which notifies a user of telephone termination or mail reception.

8. An apparatus according to claim 1, further comprising display means for displaying an image,
   wherein said control means controls a brightness of said display means in accordance with a determination result of said determination means.

9. A portable terminal apparatus comprising:
   a camera which senses an image;
   audio output means for outputting a notification sound;
   calculation means for luminances of processing blocks which form one frame, on the basics of a video signal from said camera;
   determination means for determining an ambient brightness or an ambient darkness at a predetermined time interval on the basis of the luminances of the processing blocks that are calculated by said calculation means, a determination of ambient brightness being made if a number of processing blocks having luminances higher than a specified value is at least a certain fraction of the number of processing blocks which form one frame, and a determination of ambient darkness being made if said number of processing blocks having luminances higher than said specified value is less than said certain fraction of the number of processing blocks which form one frame; and control means for initially setting an output volume of said audio output means to a predetermined small volume if said determination of ambient brightness is made or a predetermined large volume if said determination of ambient darkness is made and then incrementally controlling to produce a step increase in said output volume of said audio output means by a predetermined value if said determination of ambient darkness is made or a step decrease in said output volume of said audio output means by a predetermined value if said determination of ambient brightness is made.

10. A method of controlling a portable terminal apparatus having a camera which senses an image, and audio output means for outputting a notification sound, comprising the steps of determining whether it is bright or dark around the portable terminal apparatus, at a predetermined time interval on the basis of a video signal from the camera, a determination of brightness around said portable terminal apparatus being made if a calculated luminance level is greater than a specified value, and a determination of darkness around said portable terminal apparatus being made if a calculated luminance level is less than or equal to said specified value, said specified value being used at least when said determination means makes a determination of brightness after an immediately prior determination of brightness or makes a determination of darkness after an immediately prior determination of darkness; and initially setting an output volume of said audio output means to a predetermined small volume if said determination of brightness is made or a predetermined large volume if said determination of darkness is made and then incrementally controlling to produce a step increase in said output volume of said audio output means by a predetermined value if said determination of darkness is made or a step decrease in said output volume of said audio output means by a predetermined value if said determination of brightness is made.

11. A method according to claim 10, further comprising the step of calculating luminances of processing blocks which form one frame, on the basis of the video signal from the camera, wherein in the determination step, an ambient brightness is determined on the basis of the calculated luminances of the processing blocks.

12. A method according to claim 11, wherein in the calculation step, luminances of only some of the processing blocks in one frame are calculated.

13. A method according to claim 11, wherein in the determination step, different specified values are used between a case in which a state changes from a dark state to a bright state, and a case in which the state changes from a bright state to a dark state.

14. A method according to claim 10, wherein the determination step comprises the steps of determining a brightness upon telephone termination or mail reception, and subsequently determining the brightness at a predetermined time interval.

15. A method according to claim 10, wherein the audio output means outputs a notification sound which notifies a user of telephone termination or mail reception.

16. A method according to claim 10, further comprising the step of controlling a brightness of video display in accordance with a determination result.

17. A method of controlling a portable terminal apparatus having a camera which photographs an image and audio output means for outputting a notification sound, comprising the steps of:

calculating luminances of processing blocks which form one frame, on the basis of a video signal from the camera;

determining an ambient brightness or an ambient darkness at a predetermined time interval on the basis of the calculated luminances of the processing blocks, a determination of ambient brightness being made if a number of processing blocks having luminances higher than a specified value is at least a certain fraction of the number of processing blocks which form one frame, and a determination of ambient darkness being made if said number of processing blocks having luminances higher than said specified value is less than said certain fraction of the number of processing blocks which form one frame; and initially setting an output volume of said audio output means to a predetermined small volume if said determination of ambient brightness is made or a predetermined large volume if said determination of ambient darkness is made and then incrementally controlling to produce a step increase in said output volume of said audio output means by a predetermined value if said determination of ambient darkness if made or a step decrease in said output volume of said audio output means by a predetermined value if said determination of ambient brightness is made.

18. A computer-readable recording medium configured for operative coupling with a computer of a portable terminal apparatus having a camera that senses an image, and audio output means for outputting a notification sound, said computer-readable recording medium being configured to record a program which causes the computer to execute the steps of determining whether it is bright or dark around the portable terminal apparatus, at a predetermined time interval on the basis of a video signal from the camera, a determination of brightness around said portable terminal apparatus being made if a calculated luminance level is greater than a specified value, and a determination of darkness around said portable terminal apparatus being made if a calculated luminance level is less than or equal to said specified value; and initially setting an output volume of said audio output means to a predetermined small volume if said determination of brightness is made or a predetermined large volume if said determination of darkness is made and then incrementally controlling to produce a step increase in said output volume of said audio output means by a predetermined value if said determination of darkness is made or a step decrease in said output volume of said audio output means by a predetermined value if said determination of brightness is made.

19. A computer-readable recording medium configured for operative coupling with a computer of a portable terminal apparatus having a camera that senses an image, said computer-readable recording medium being configured to record a program which causes a computer of a portable terminal apparatus having a camera that senses an image, to execute the steps of calculating luminances of processing blocks which form one frame, on the basis of a video signal from the camera, determining an ambient brightness or an ambient darkness at a predetermined time interval on the basis of the calculated luminances of the processing blocks, a determination of ambient brightness being made if a number of processing blocks having luminances higher than a specified value is at least a certain fraction of the number of processing blocks which form one frame, and a determination of ambient darkness being made if said number of processing blocks having luminances higher than said specified value is less than said certain fraction of the number of processing blocks which form one frame; and initially setting an output volume of said audio output means to a predetermined small volume if said determination of ambient brightness is made or a predetermined large volume if said determination of ambient darkness is made and then incrementally controlling to produce a step increase in said output volume of said audio output means by a predetermined value if said determination of ambient darkness is made or a step decrease in said output volume of said audio output means by a predetermined value if said determination of ambient brightness is made.

* * * * *